United States Patent
Archer et al.

(10) Patent No.: US 8,161,480 B2
(45) Date of Patent: Apr. 17, 2012

(54) PERFORMING AN ALLREDUCE OPERATION USING SHARED MEMORY

(75) Inventors: Charles J. Archer, Rochester, MN (US); Gabor Dozsa, Ardsley, NY (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 11/754,782

(22) Filed: May 29, 2007

(65) Prior Publication Data

US 2008/0301683 A1    Dec. 4, 2008

(51) Int. Cl.
G06F 9/46 (2006.01)
G06F 13/00 (2006.01)
G06F 7/38 (2006.01)

(52) U.S. Cl. ......... 718/100; 718/104; 711/147; 712/225

(58) Field of Classification Search .................. 718/104
See application file for complete search history.

(56) References Cited

U.S. PATENT DOCUMENTS

| | | |
|---|---|---|
| 4,715,032 A | 12/1987 | Nilsson |
| 4,843,540 A | 6/1989 | Stolfo |
| 5,101,480 A | 3/1992 | Shin et al. |
| 5,105,424 A | 4/1992 | Flaig et al. |
| 5,333,279 A | 7/1994 | Dunning |
| 5,377,333 A | 12/1994 | Nakagoshi et al. |
| 5,513,371 A | 4/1996 | Cypher et al. |
| 5,541,914 A | 7/1996 | Krishnamoorthy et al. |
| 5,617,538 A | 4/1997 | Heller |
| 5,721,828 A | 2/1998 | Frisch |
| 5,822,604 A | 10/1998 | Ogasawara et al. |
| 5,822,605 A | 10/1998 | Higuchi et al. |
| 5,826,049 A | 10/1998 | Ogata et al. |
| 5,832,215 A | 11/1998 | Kato et al. |
| 5,864,712 A | 1/1999 | Carmichael et al. |
| 5,878,241 A | 3/1999 | Wilkinson et al. |
| 5,892,923 A | 4/1999 | Yasuda et al. |
| 5,937,202 A | 8/1999 | Crosetto |
| 5,949,988 A | 9/1999 | Feisullin et al. |
| 5,958,017 A | 9/1999 | Scott et al. |
| 6,000,024 A | 12/1999 | Maddox |
| 6,067,609 A | 5/2000 | Meeker et al. |
| 6,076,131 A | 6/2000 | Nugent |
| 6,212,617 B1 | 4/2001 | Hardwick |

(Continued)

OTHER PUBLICATIONS

M. Matsuda, T. Koduh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.

(Continued)

*Primary Examiner* — Kenneth Tang

(74) *Attorney, Agent, or Firm* — Biggers & Ohanian, LLP

(57) ABSTRACT

Methods, apparatus, and products are disclosed for performing an allreduce operation using shared memory that include: receiving, by at least one of a plurality of processing cores on a compute node, an instruction to perform an allreduce operation; establishing, by the core that received the instruction, a job status object for specifying a plurality of shared memory allreduce work units, the plurality of shared memory allreduce work units together performing the allreduce operation on the compute node; determining, by an available core on the compute node, a next shared memory allreduce work unit in the job status object; and performing, by that available core on the compute node, that next shared memory allreduce work unit.

17 Claims, 8 Drawing Sheets

U.S. PATENT DOCUMENTS

| | | | |
|---|---|---|---|
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,480,885 | B1 | 11/2002 | Olivier |
| 6,647,438 | B1 | 11/2003 | Conner et al. |
| 6,714,552 | B1 | 3/2004 | Cotter |
| 6,742,063 | B1 | 5/2004 | Hellum et al. |
| 6,754,211 | B1 | 6/2004 | Brown |
| 6,914,606 | B2 | 7/2005 | Amemiya et al. |
| 6,954,806 | B2 | 10/2005 | Yosimoto et al. |
| 7,133,359 | B2 | 11/2006 | Weis |
| 7,263,598 | B2 | 8/2007 | Ambuel |
| 7,284,033 | B2 | 10/2007 | Jhanji |
| 7,496,699 | B2 | 2/2009 | Pope et al. |
| 7,539,989 | B2 | 5/2009 | Blackmore et al. |
| 7,587,516 | B2 | 9/2009 | Bhanot et al. |
| 7,600,095 | B2 | 10/2009 | Archer et al. |
| 7,664,110 | B1 | 2/2010 | Lovett et al. |
| 7,853,639 | B2 | 12/2010 | Archer et al. |
| 2002/0016901 | A1 | 2/2002 | Carvey et al. |
| 2002/0054051 | A1 | 5/2002 | Ladd |
| 2002/0065984 | A1 | 5/2002 | Thompson et al. |
| 2002/0144027 | A1 | 10/2002 | Schmisseur |
| 2003/0188054 | A1 | 10/2003 | Yosimoto et al. |
| 2003/0212877 | A1 | 11/2003 | Dally et al. |
| 2004/0034678 | A1 | 2/2004 | Kuszmaul et al. |
| 2004/0073590 | A1 | 4/2004 | Bhanot et al. |
| 2005/0094577 | A1 | 5/2005 | Ashwood-Smith |
| 2005/0135395 | A1 | 6/2005 | Fan et al. |
| 2005/0165980 | A1 | 7/2005 | Clayton et al. |
| 2005/0243711 | A1 | 11/2005 | Alicherry et al. |
| 2006/0168359 | A1 | 7/2006 | Bissessur et al. |
| 2006/0179181 | A1 | 8/2006 | Seong |
| 2006/0277323 | A1 | 12/2006 | Joublin et al. |
| 2007/0110063 | A1 | 5/2007 | Tang et al. |
| 2007/0174558 | A1* | 7/2007 | Jia et al. ........................ 711/147 |
| 2007/0242611 | A1 | 10/2007 | Archer et al. |
| 2007/0245122 | A1 | 10/2007 | Archer et al. |
| 2007/0288935 | A1 | 12/2007 | Tannenbaum et al. |
| 2008/0127146 | A1* | 5/2008 | Liao et al. ..................... 717/150 |
| 2008/0301683 | A1 | 12/2008 | Archer et al. |
| 2009/0006662 | A1 | 1/2009 | Chen et al. |
| 2009/0064176 | A1 | 3/2009 | Ohly et al. |
| 2009/0067334 | A1 | 3/2009 | Archer et al. |
| 2009/0154486 | A1 | 6/2009 | Archer et al. |
| 2009/0196361 | A1 | 8/2009 | Chan et al. |
| 2009/0292905 | A1 | 11/2009 | Faraj |
| 2010/0122268 | A1 | 5/2010 | Jia |
| 2010/0185718 | A1 | 7/2010 | Archer et al. |
| 2011/0119673 | A1 | 5/2011 | Bloch et al. |

OTHER PUBLICATIONS

DADO: A Tree-Structured Machine Architecture for Production Systems, Stolfo et al. AAAI Proceedings, 1982, Columbia University.

Eunseuk Oh, An All-Reduce Operation in Star Networks Using All-to-All Broadcast Communication Patterns, 2005, 1-8.

Xin Yuan, Bandwidth Efficient All-reduce Operation on Tree Topologies, 2001, 1-8.

Final Office Action, U.S. Appl. No. 11/769,367, Sep. 28, 2010.
Final Office Action, U.S. Appl. No. 12/053,842, Oct. 18, 2010.
Advisory Action, U.S. Appl. No. 12/053,842, Jan. 11, 2011.
Office Action, U.S. Appl. No. 12/053,842, Mar. 1, 2011.
Office Action, U.S. Appl. No. 12/503,902, Oct. 6, 2010.
Office Action, U.S. Appl. No. 12/060,492, May 27, 2010.
Final Office Action, U.S. Appl. No. 12/060,492, Dec. 2, 2010.
Office Action, U.S. Appl. No. 12/124,763, Oct. 14, 2010.
Office Action, U.S. Appl. No. 12/124,756, Oct. 18, 2010.
Final Office Action Dated Oct. 30, 2009 in U.S. Appl. No. 11/769,367.
Office Action Dated Jan. 14, 2010 in U.S. Appl. No. 11/843,083.
Office Action Dated Apr. 28, 2010 in U.S. Appl. No. 11/769,367.
U.S. Appl. No. 12/770,286, filed Apr. 2010, Archer et al.
U.S. Appl. No. 12/748,594, filed Mar. 2010, Archer et al.
Office Action, U.S. Appl. No. 11/754,740, Apr. 11, 2011.
Final Office Action, U.S. Appl. No. 12/124,756, Mar. 28, 2011.
Sunggu Lee; Shin, K.G., "Interleaved all-to-all reliable broadcast on meshes and hypercubes," Parallel and Distributed Systems, IEEE Transactions on, vol. 5, pp. 449-458, May 1994.
Wikipedia. "Depth-First Search" May 5, 2007. http://web.archive.org/web/20070505212029/http://en.wikipedia.org/wiki/Depth-first_Search.
Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.
U.S. Appl. No. 60/271,124, filed Feb. 24, 2001, pp. 12-13, 27 and 42-43.
Office Action Dated Mar. 4, 2008 in U.S. Appl. No. 11/279,620.
Office Action Dated Sep. 3, 2008 in U.S. Appl. No. 11/279,620.
Office Action Dated Dec. 29, 2008 in U.S. Appl. No. 11/279,620.
Office Action Dated Apr. 3, 2009 in U.S. Appl. No. 11/769,367.
Office Action Dated Dec. 13, 2007 in U.S. Appl. No. 11/459,387.
Office Action Dated Jul. 11, 2008 in U.S. Appl. No. 11/459,387.
Office Action Dated Mar. 18, 2009 in U.S. Appl. No. 11/459,387.
Sistare, et al.; Optimization of MPI collectives on clusters of large-scale SMP's, Conference on High Performance Networking and Computing, Proceedings of the 1999 ACM/IEEE conference on Supercomputing; 1999.
Tanenbaum, Structured Computer Organization, Second Edition, Prentice-Hall, Inc., 1984.
Rosenberg; Dictionarty of Computers, Information Processing & Telecommunications, Second Edition, John Wiley & Sons, 1987.
Herbordt, M.C., Weems, C.C.; "Computing Parallel Prefix and Reduction Using Coterie Structures"; Frontiers of Massively Parallel Computation; 1992; Fourth Symposium; Oct. 19-24, 1992; pp. 141-149.
Fisher, et al.; "Computing the Hough Transform on a Scar Line Array Processor"; IEEE Transactions on Pattern Analysis and Machine Intelligence; vol. II, No. 3; Mar. 1989; pp. 262-265.
Office Action Dated Jul. 20, 2009 in U.S. Appl. No. 11/737,209.
Office Action Dated Sep. 4, 2009 in U.S. Appl. No. 11/843,090.
Edmonds, "AM++: A Generalized Active Message Framework,"pp. 1-10, Sep. 2010.
Bangalore. "Extending the Message Passing Interface (MPI)", Proc. of the 1994 Conf. on Scalable Parallel Libraries, IEEE, pp. 106-118, 1995.
Bafna, "Coprocessor Design to Support MPI Primitives in Configurable Mutliprocessors;" *Integration, the VSLI Journal*, vol. 40 , Issue 3 , pp. 235-252, Apr. 2007.
Keller, Rainer; "MPI Development Tools and Applications for the Grid," Jun. 2003, pp. 1-12.
Tang, Hong; "Optimizing threaded MPI execution on SMP clusters," *International Conference on Supercomputer*, Jun. 2001, pp. 381-392.
Office Action, U.S. Appl. No. 11/754,782, Jun. 23, 2011.
Final Office Action, U.S. Appl. No. 12/053,842, May 23, 2011.
Office Action, U.S. Appl. No. 12/176,816, Jun. 10, 2011.

* cited by examiner

PERFORMING AN ALLREDUCE OPERATION USING SHARED MEMORY

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for performing an allreduce operation using shared memory.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allreduce operation. An allreduce operation is a reduction operation that combines multiple data sets spread across multiple compute nodes into a single data set using an arithmetic operator such as, for example, a bitwise OR operator, an addition operator, a multiplication operator, and so on. The result of the allreduce operation is then provided to all the compute nodes participating in the operation. Because thousands of compute nodes may be involved in the allreduce operation and the tree network is highly optimized for collective operations, the tree network provides performance advantages over a torus network when performing an allreduce operation.

Typically in an allreduce operation, each node contributes a single data set to the global allreduce operation that occurs through the tree network. When a single compute node includes multiple processing cores running multiple parallel algorithms, however, that single data set contributed to the global allreduce operation may itself be the result of an allreduce operation that occurs locally on the compute node. In performing a local allreduce operation, the processing cores typically communicate with each other through the use of message passing routines. Because messaging passing between cores incurs significant overhead, the local allreduce on each compute node may become a bottleneck for the global allreduce as the number of processing cores in each compute node increases. As such, readers will appreciate that room for improvement exists in performing an allreduce operation.

SUMMARY OF THE INVENTION

Methods, apparatus, and products are disclosed for performing an allreduce operation using shared memory that include: receiving, by at least one of a plurality of processing cores on a compute node, an instruction to perform an allreduce operation; establishing, by the core that received the instruction, a job status object for specifying a plurality of shared memory allreduce work units, the plurality of shared memory allreduce work units together performing the allreduce operation on the compute node; determining, by an available core on the compute node, a next shared memory allreduce work unit in the job status object; and performing, by that available core on the compute node, that next shared memory allreduce work unit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
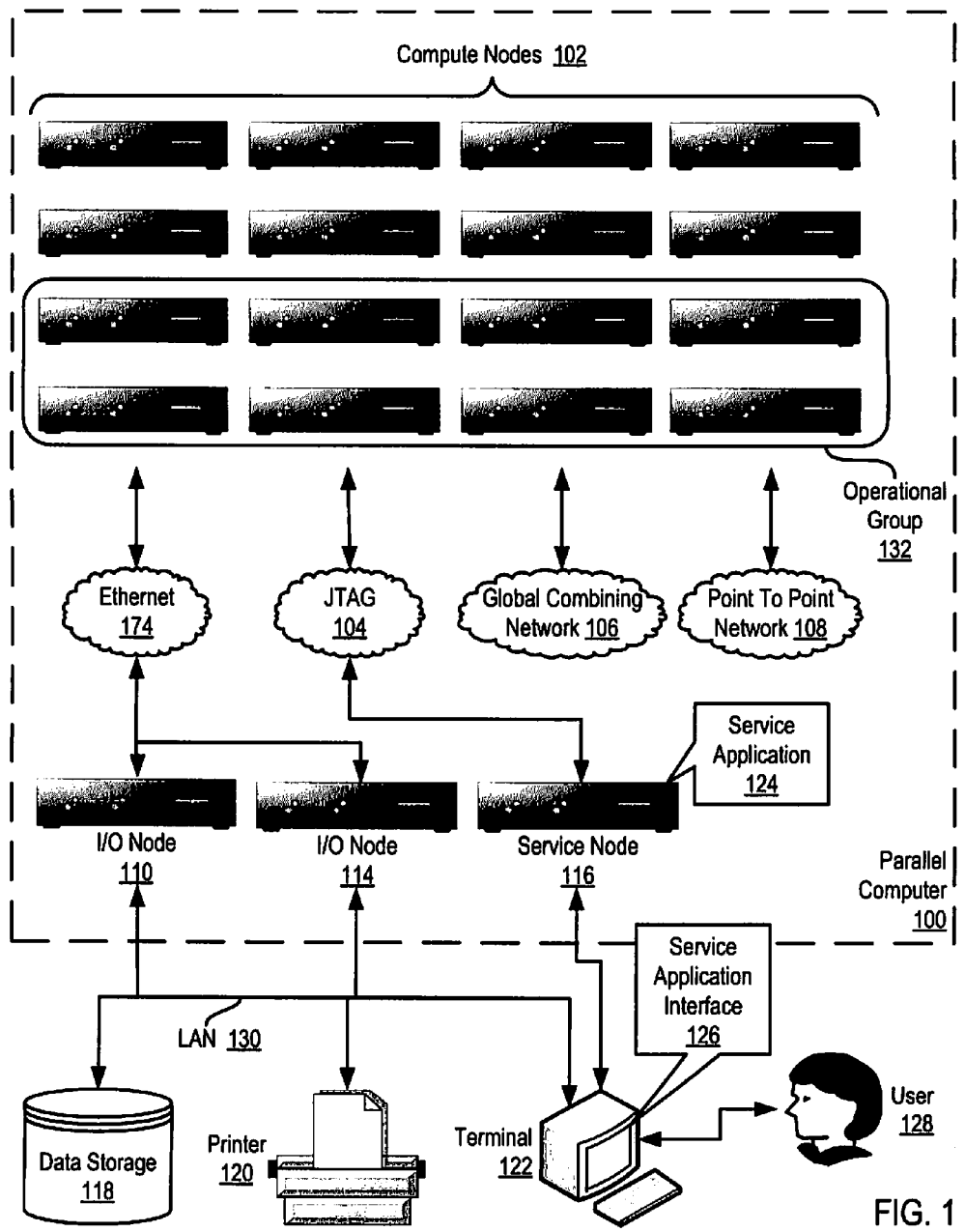
FIG. 1 illustrates an exemplary system for performing an allreduce operation using shared memory according to embodiments of the present invention.

Exemplary methods, apparatus, and computer program products for performing an allreduce operation using shared memory according to embodiments of the present invention are described with reference to the accompanying drawings, beginning with FIG. 1. FIG. 1 illustrates an exemplary system for performing an allreduce operation using shared memory according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). The parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point to point network (108), which is optimized for point to point operations using a torus network topology. The global combining network (106) is a data communications network that includes data communications links connected to the compute nodes so as to organize the compute nodes as a binary tree. Each data communications network is implemented with data communications links among the compute nodes (102). The data communications links provide data communications for parallel operations among the compute nodes of the parallel computer.

In addition, the compute nodes (102) of the parallel computer (100) are organized into at least one operational group (132) of compute nodes for collective parallel operations on parallel computer (100). An operational group of compute nodes is the set of compute nodes upon which a collective parallel operation executes. Each compute node in the operational group assigned a unique rank that identifies the particular compute node in the operational group. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' a prior art parallel communications library, a module of computer program instructions for data communications on parallel computers. Examples of prior-art parallel communications libraries that may be improved for performing an allreduce operation using shared memory according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

As described in more detail below in this specification, the system of FIG. 1 operates generally for a performing an allreduce operation using shared memory according to embodiments of the present invention by: receiving, by at least one of a plurality of processing cores on a compute node (102), an instruction to perform an allreduce operation; establishing, by the core that received the instruction, a job status object for specifying a plurality of shared memory allreduce work units, the plurality of shared memory allreduce work units together performing the allreduce operation on the compute node; determining, by an available core on the compute node (102), a next shared memory allreduce work unit in the job status object; and performing, by that available core on the compute node (102), that next shared memory allreduce work unit. The job status object is a data structure residing in shared memory of the compute node that specifies a plurality of shared memory allreduce work units. A shared memory allreduce work unit is one of a plurality of processing steps that, taken together, perform the allreduce operation on the compute node. An available core is any processing core of the compute node that is available to perform a shared memory allreduce work unit, including the core that established the job status object.

An allreduce operation typically specifies an arithmetic operator used in deriving a global reduction result from the local data on each compute node. For example, an allreduce operation may specify performing the reduction using a bitwise OR operator, an addition operator, a multiplication operator, and so on. A 'bitwise OR operation,' as the term is used in this specification, is an inclusive bitwise OR operation rather than an exclusive bitwise OR operation. The symbol for the inclusive bitwise OR function in the C and C++ programming languages is '|'. The inclusive bitwise OR function conducts a logical OR function separately on each bit of its operands. The effect is to turn bits on. For these operands, for example, x=00000000 00000001 00000000, in decimal, x=010, and
y=00000000 00000000 00000010, in decimal, y=002,
x=x|y yields x=00000000 00000001 00000010, in decimal, x=012. That is, all the bits that were on in each operand are also on in the result of the bitwise OR function.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, computer (100) includes input/output ('I/O') nodes (110, 114) coupled to compute nodes (102) through the data communications network (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of performing an allreduce operation using shared memory according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of executing a performing an allreduce operation using shared memory according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing an allreduce operation using shared memory according to embodiments of the present invention is generally implemented on a parallel computer that includes a plurality of compute nodes. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an exemplary compute node useful in a parallel computer capable of a performing an allreduce operation using shared memory according to embodiments of the present invention. The compute node (152) of FIG. 2 includes a plurality of processing cores (164) as well as random access memory ('RAM') (156). The processing cores (164) of FIG. 2 may be configured on one or more integrated circuit dies. Processing cores (164) are connected to RAM (156) through a high-speed memory bus (154) and through a bus adapter (194) and an extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in a performing an allreduce operation using shared memory according to embodiments of the present invention, using a traditional programming language such as the C programming language, and using traditional programming methods to write parallel communications routines that send and receive data among nodes on two independent data communications networks. Alternatively, existing prior art libraries may be improved according to embodiments of the present invention. Examples of prior-art parallel communications libraries that may be improved for a performing an allreduce operation using shared memory according to embodiments of the present invention include the 'Message Passing Interface' ('MPI') library and the 'Parallel Virtual Machine' ('PVM') library. However it is developed, the parallel communications routines of parallel communication library (160) are improved to perform an allreduce operation using shared memory according to embodiments of the present invention by: receiving, by at least one of a plurality of processing cores (164) on a compute node (152), an instruction to perform an allreduce operation; establishing, by the core (164) that received the instruction, a job status object for specifying a plurality of shared memory allreduce work units, the plurality of shared memory allreduce work units together performing the allreduce operation on the compute node (152); determining, by an available core on the compute node (152), a next shared memory allreduce work unit in the job status object; and performing, by that available core on the compute node (152), that next shared memory allreduce work unit.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
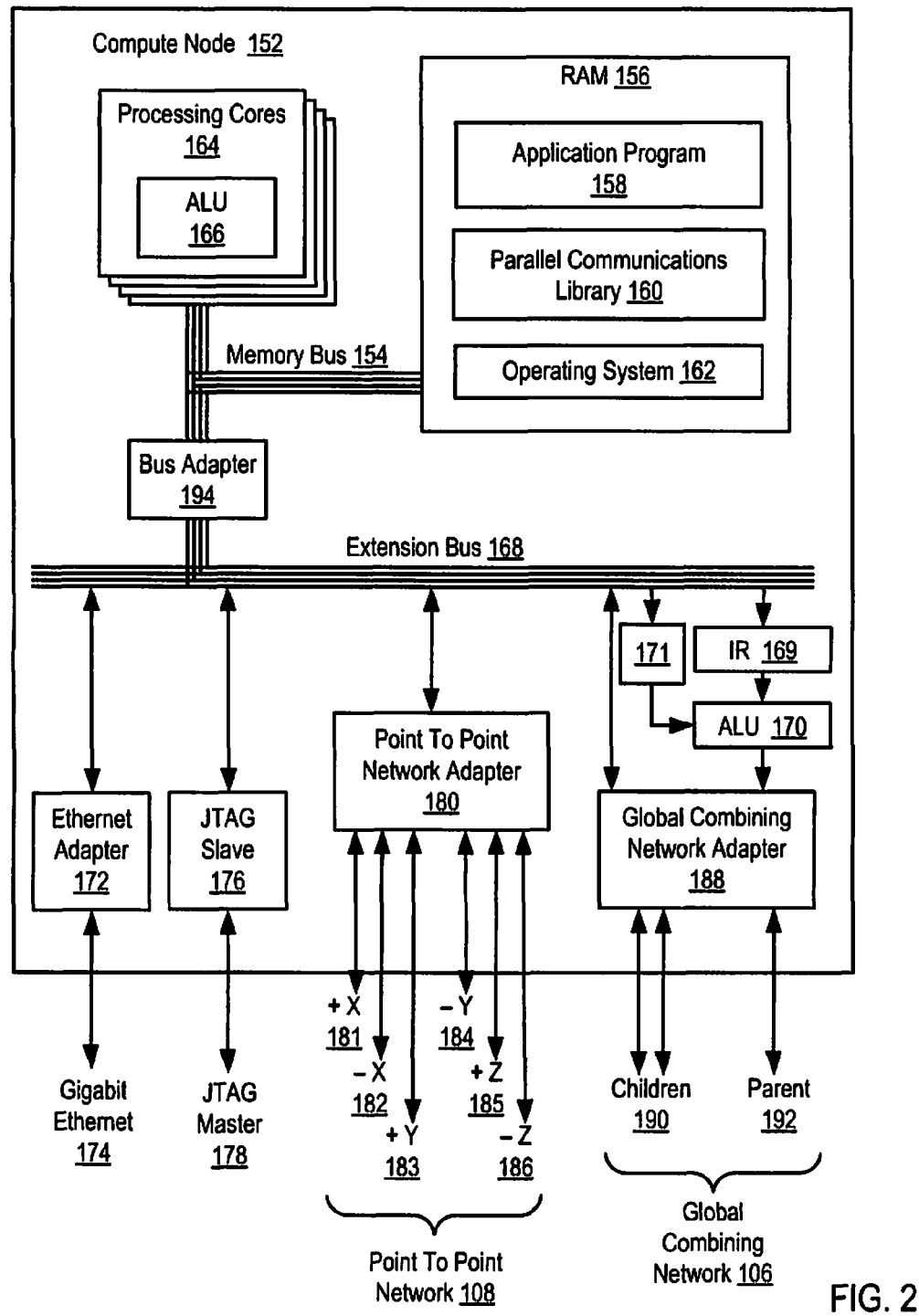
FIG. 2 sets forth a block diagram of an exemplary compute node useful in a parallel computer capable of a performing an allreduce operation using shared memory according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that perform an allreduce operation using shared memory according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (152) for use in performing an allreduce operation using shared memory according to embodiments of the present invention.

The data communications adapters in the example of FIG. 2 include a Point To Point Network Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (152) for data communications to a network (106) that is optimal for collective message passing operations such as, for example, a network configured as a binary tree. Global Combining Network Adapter (188) provides data communications through three bidirectional links: two to children nodes (190) and one to a parent node (192).

Example compute node (152) includes multiple arithmetic logic units ('ALUs'). Each processing core (164) includes an ALU (166), and a separate ALU (170) is dedicated to the exclusive use of Global Combining Network Adapter (188) for use in performing the arithmetic and logical functions of reduction operations, including an allreduce operation. Computer program instructions of a reduction routine in parallel communications library (160) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of ALU (166) in processing core (164) or, typically much faster, by use dedicated ALU (170) using data provided by the nodes (190, 192) on the global combining network (106) and data provided by processing cores (164) on the compute node (152).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (162) on the compute node (152) contribute data that alters the output of ALU (170), which is then passed up or down the global combining network (106). Because the ALU (170) typically does not output any data onto the network (106) until the ALU (170) receives input from one of the processing cores (164), a processing core (164) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (152) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
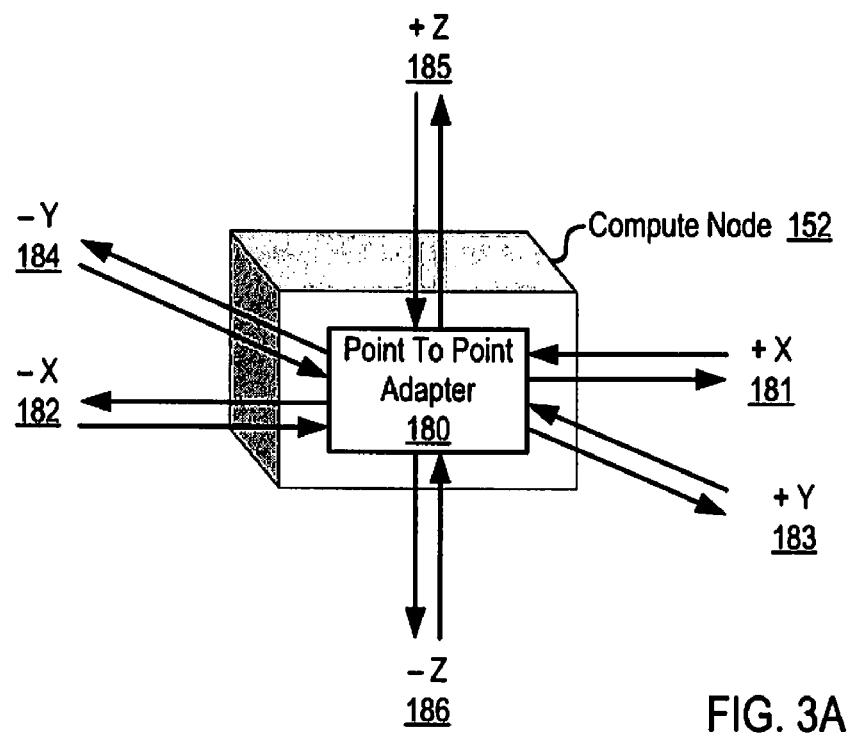
FIG. 3A illustrates a block diagram of an exemplary Point To Point Adapter useful in systems that perform an allreduce operation using shared memory according to embodiments of the present invention.

For further explanation, FIG. 3A illustrates a block diagram of an exemplary Point To Point Adapter useful in systems that perform an allreduce operation using shared memory according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
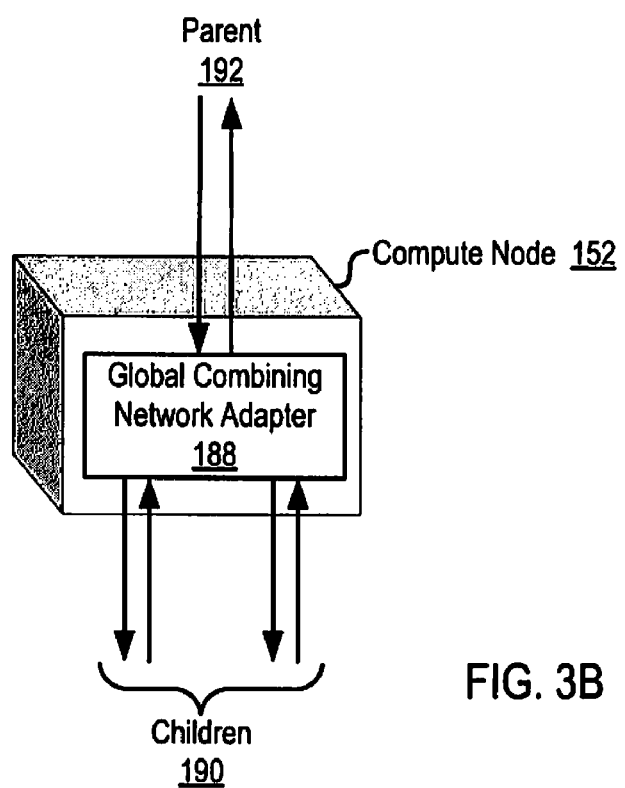
FIG. 3B illustrates a block diagram of an exemplary Global Combining Network Adapter useful in systems that perform an allreduce operation using shared memory according to embodiments of the present invention.

For further explanation, FIG. 3B illustrates a block diagram of an exemplary Global Combining Network Adapter useful in systems that perform an allreduce operation using shared memory according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from two children nodes through four unidirectional data communications links (190). The Global Combining Network Adapter (188) also provides data communication to and from a parent node through two unidirectional data communications links (192).

Figure 4:
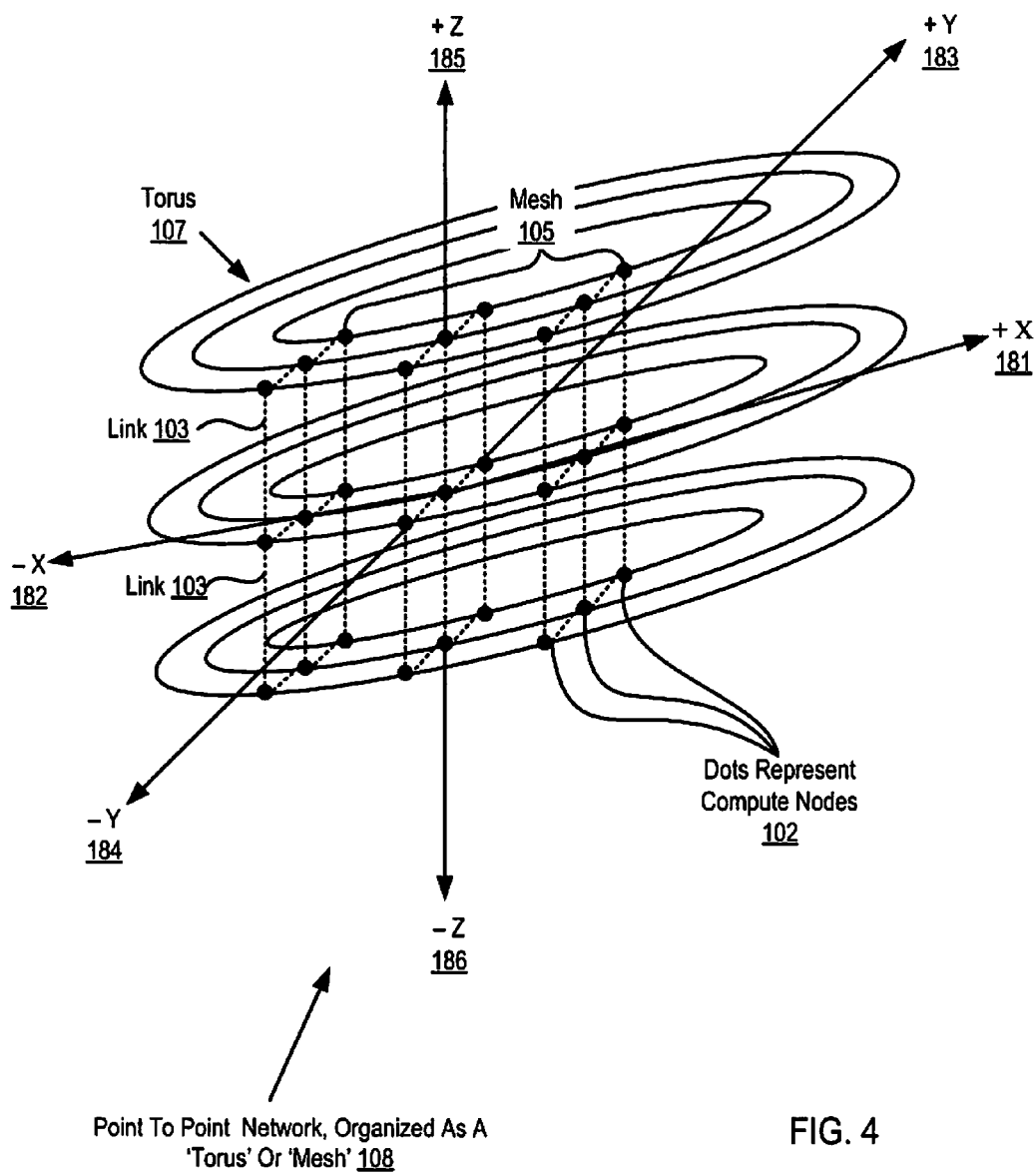
FIG. 4 sets forth a line drawing illustrating an exemplary data communications network optimized for point to point operations useful in systems that perform an allreduce operation using shared memory according to embodiments of the present invention.

For further explanation, FIG. 4 sets forth a line drawing illustrating an exemplary data communications network optimized for point to point operations useful in systems that perform an allreduce operation using shared memory according to embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in a performing an allreduce operation using shared memory accordance with embodiments of the present invention may contain only a few compute nodes or may contain thousands of compute nodes.

Figure 5:
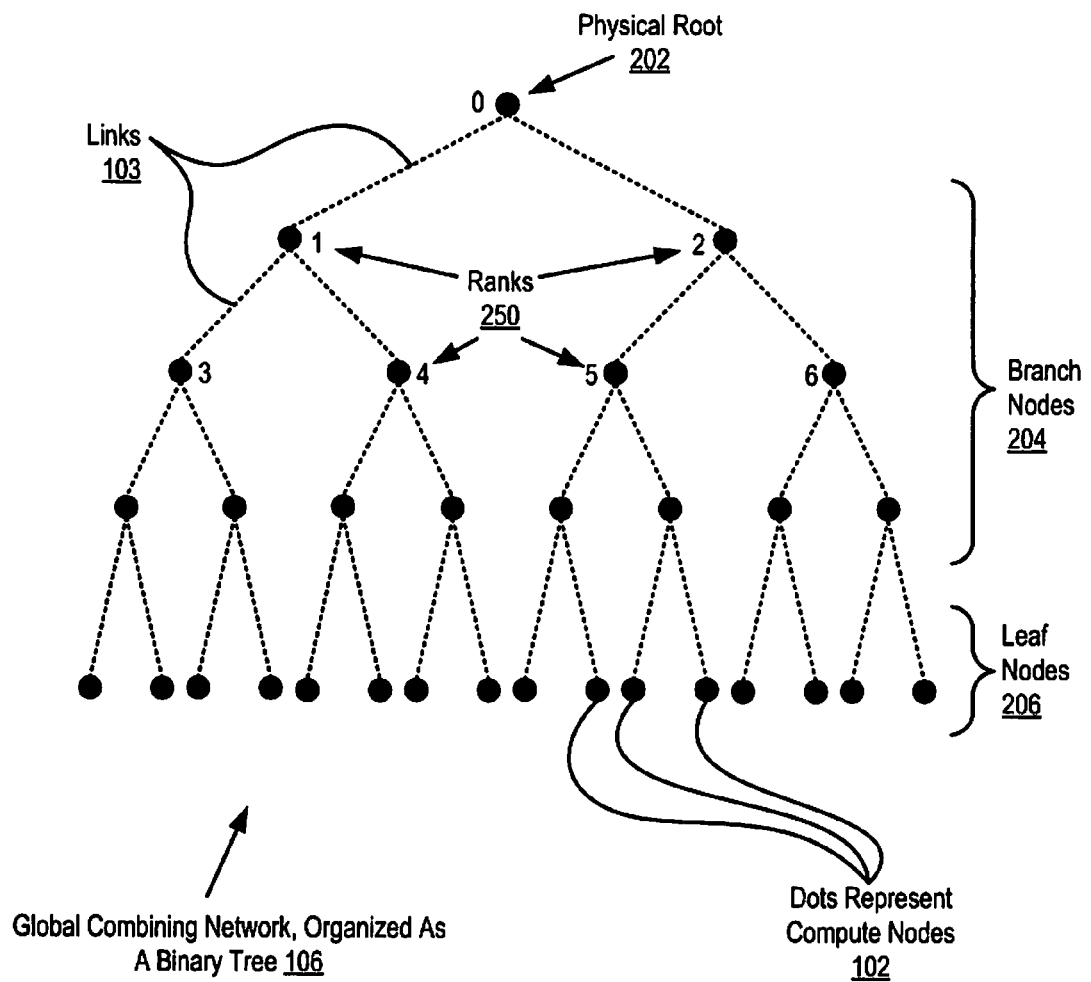
FIG. 5 sets forth a line drawing illustrating an exemplary global combining network useful in systems that execute a performing an allreduce operation using shared memory according to embodiments of the present invention.

For further explanation, FIG. 5 sets forth a line drawing illustrating an exemplary global combining network useful in systems that execute a performing an allreduce operation using shared memory according to embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network optimized for collective operations for use in executing a performing an allreduce operation using shared memory accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the global combining network (106) provides data communications among all the nodes (102) in the binary tree to effect parallel reduction operations useful for performing an allreduce operation using shared memory according to embodiments of the present invention. Consider, for example, that each compute node (102) calls an allreduce operation. Each compute node (102) transmits local reduction results to the other compute nodes through the global combining network (106). Each compute node (102) performs the arithmetic operation specified by the allreduce operation in the node's global combining adapter on the local reduction results from that node itself and the local reduction results received from the children nodes. Each compute node (102) then passes the result of the arithmetic operation up to the node's parent. In such a manner, the local reduction results from each compute node (102) are combined and cascade up to the physical root node (202) as the global reduction results. Upon the global reduction result being calculated by the physical root node (202), the physical root (202) sends the global reduction result down the tree (106) to each compute node. Each compute node (102) then receives global reduction results through the network (106) and stores the global reduction results into shared memory.

Figure 6:
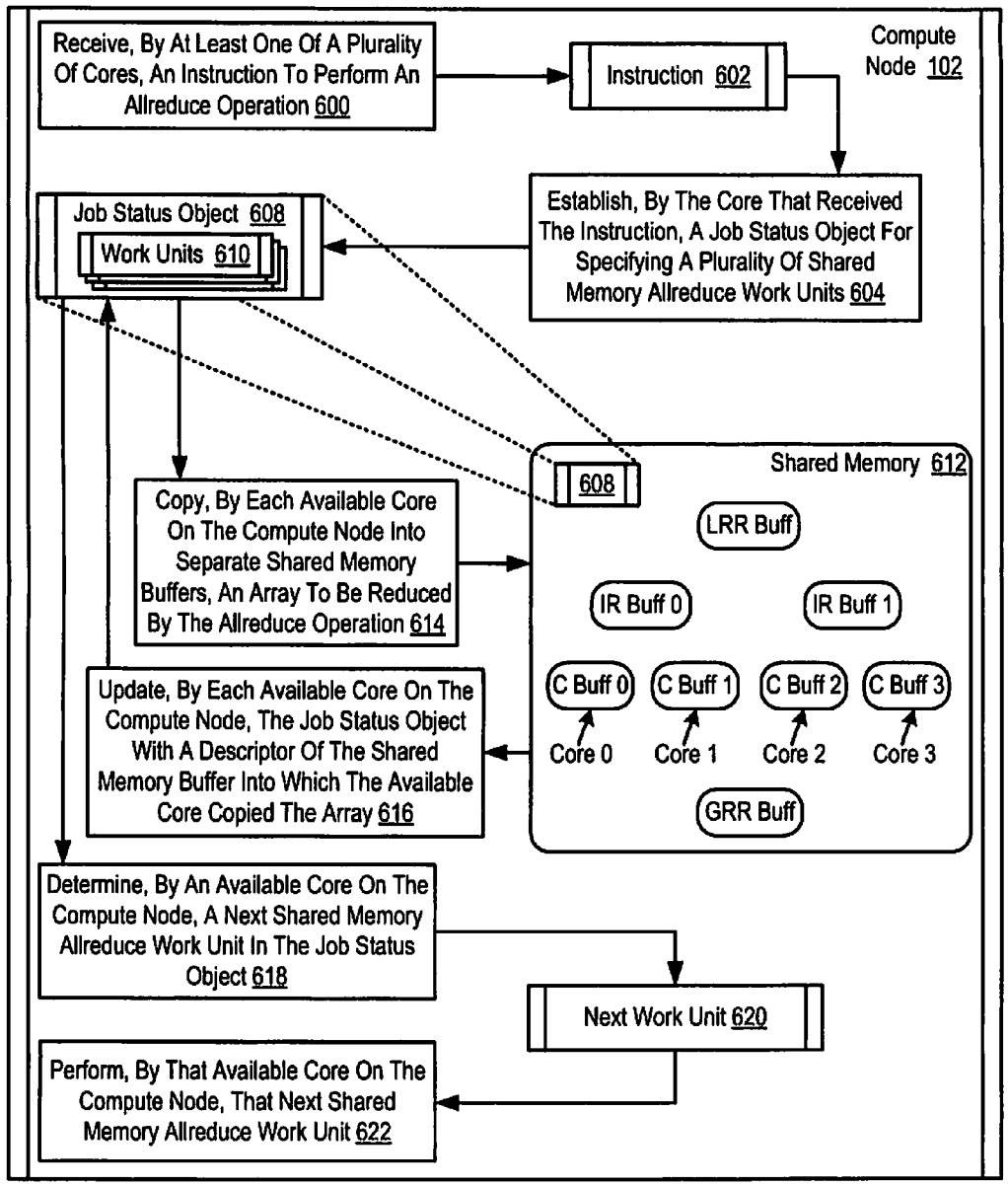
FIG. 6 sets forth a flow chart illustrating an exemplary method of performing an allreduce operation using shared memory according to embodiments of the present invention.

For further explanation, FIG. 6 sets forth a flow chart illustrating an exemplary method of performing an allreduce operation using shared memory (612) according to embodiments of the present invention. The memory (612) of FIG. 6 is shared in the sense that all the processing cores of the compute node have access to the memory (612) for reading, writing, and updating data. The method of FIG. 6 includes receiving (600), by at least one of a plurality of processing cores on a compute node (102), an instruction (602) to perform an allreduce operation. The instruction (602) of FIG. 6 represents a set of computer program instructions of a parallel algorithm being executed by a processing core of the compute node. The instruction (602) received (600) by one the processing cores may be implemented in the parallel algorithm as a version of MPI_Allreduce improved according to embodiments of the present invention. Whether all the processing cores of compute node (102) receive (600) the instruction (602) to perform an allreduce operation may often depend on the operating mode of the compute node (102). In some embodiments, the compute node's operating mode may allow each processing core to independently execute the parallel algorithm. In such a mode, each processing core may receive (600) the instruction (602) to perform an allreduce operation. In other embodiments, the compute node's operating mode may provide that the processing cores operate in a cooperative manner and only one of the processing cores may receive (600) the instruction (602) to perform the allreduce operation.

The method of FIG. 6 also includes establishing (604), by the core that received the instruction (602), a job status object (608) for specifying a plurality of shared memory allreduce work units (610). The job status object (608) is a data structure residing in shared memory (612) of the compute node (102) that specifies a plurality of shared memory allreduce work units (610). A shared memory allreduce work unit (610) is one of a plurality of processing steps that, taken together, perform the allreduce operation on the compute node (102). The job status object (608) may specify the shared memory allreduce work units (610) using the status of a number of buffers. Consider, for example, the following exemplary job status object illustrated in Table 1:

TABLE 1

| | JOB STATUS OBJECT | | | |
|---|---|---|---|---|
| BUFF. ID | CURRENTLY PROCESSING | BASE ADDRESS | BUFFER SIZE | ELEMENTS TO PROCESS |
| C Buff 0 | No | — | 4096 | 0 |
| C Buff 1 | No | — | 4096 | 0 |
| C Buff 2 | No | — | 4096 | 0 |
| C Buff 3 | No | — | 4096 | 0 |
| IR Buff 0 | No | 0xAEEEEE00 | 4096 | 0 |
| IR Buff 1 | No | 0xAEEEEF00 | 4096 | 0 |
| LRR Buff | No | 0xAEEEF000 | 4096 | 0 |
| GRR Buff | No | 0xAEEEF100 | 4096 | 0 |

The exemplary job status object illustrated in Table 1 specifies shared memory allreduce work units using the status of a number of buffers, each buffer represented by a row in Table 1. Each row includes a 'Buffer Identifier' field that identifies a particular buffer containing data elements to be processed. The 'Buffer ID's for each work unit not only identify each buffer, but also indicates the type of processing to be perform on the data elements in the identified buffer. For example, 'C Buff 0,' 'C Buff 1,' 'C Buff 2,' and 'C Buff 3' all identify contribution buffers that each store data as elements of an array to be reduced by the allreduce operation. 'IR Buff 0' and 'IR Buff 1' each identify interim reduction buffers in shared memory (612) that each store the reduction results from two contribution buffers. 'LLR Buff' identifies the local reduction results buffer that store the reduction results for the entire compute node to be transmitted to other compute nodes through a global combining network. The local reduction results from all the compute nodes on the network are then processed to yield a global reduction result for the entire network. 'GRR Buff' identifies the global reduction result buffer in shared memory (612) that stores the global reduction result received from the network. Each row in the exemplary job status object illustrated in Table 1 specifies the location of the buffer using a 'Base Address' and 'Buffer Size.' The 'Base Address' indicates the location in shared memory (612) of the first memory address occupied by the buffer for each work unit (610). The 'Buffer Size' indicates the size of the buffer for each work unit (610). Each row in the exemplary job status object illustrated in Table 1 also includes 'Currently Processing' and 'Elements To Process' fields. The 'Currently Processing' field indicates whether an available processing core is currently processing the shared memory allreduce work unit (610) specified by the particular row in the job status object (608). The 'Elements To Process' field indicates the number of elements in the array stored in the buffer for the particular work unit that have not yet been processed. Readers will note that the exemplary Table 1 above is for explanation and not for limitation.

In the example of FIG. 6, the core that received the instruction (602) is typically the first processing core to receive the instruction (602) to perform the allreduce operation. In the example of FIG. 6, the core that received the instruction (602) is identified as 'Core 0.' The core that received the instruction (602), 'Core 0' in this example, establishes (604) a job status object (608) according to the method of FIG. 6 by configuring the job status object (608) in shared memory (612) of the compute node (102) and configuring the buffers identified as 'IR Buff 0,' IR Buff 1,' 'LRR Buff,' and 'GRR Buff.' Core 0 configures these buffers to provide storage locations for data processed during the allreduce operation. Core 0 may obtain the size of each buffer from the instruction (602) to perform the allreduce operation.

As mentioned above, the compute node's operating mode may allow each processing core to independently execute a parallel algorithm. In such a mode, each processing core may receive (600) the instruction (602) to perform an allreduce operation. When the first processing core that receives (600) the instruction (602) establishes (604) the job status object (608), the remaining cores do not attempt to re-establish the job status object (608) as each core receives an instruction (602) to perform the allreduce operation because each core detects that the job status object (608) is already established.

In embodiments where the compute node's operating mode provides that the processing cores operate in a cooperative manner and only one of the processing cores may receive (600) the instruction (602) to perform the allreduce operation, the processing core that received the instruction (602) may establish (604) a job status object (608) according to the method of FIG. 6 by assigning (606) a plurality of threads for executing the shared memory allreduce work units (610) to the other processing cores of the compute node (102).

The processing core that received the instruction (602) may assign (606) a plurality of threads for executing the shared memory allreduce work units (610) to the other processing cores of the compute node (102) by spawning threads of execution for each of the idle processing cores on the compute node (102) or spawning threads of execution for all of the other processing cores on the compute node (102) and preempting each core's current processing with one of the spawned threads. Readers will note that assigning a plurality of threads is typically unnecessary when the compute node's operating mode allows for each processing core to eventually receive the instruction (602) to perform the allreduce operation.

The method of FIG. 6 includes copying (614), by each available processing core on the compute node (102) into separate shared memory buffers, an array to be reduced by the allreduce operation. An available core is any processing core of the compute node that is available to perform a shared memory allreduce work unit (610) specified in the job status object (608), including the core that established the job status object (608). Each available processing core may copy (614) an array to be reduced by the allreduce operation into separate shared memory buffers according to the method of FIG. 6 by allocating a range of address space in shared memory (612) for a buffer capable of storing the array and copying the array into the allocated address space. Consider, for example, that compute node (102) of FIG. 6 has four available cores identified as 'Core 0,' 'Core 1,' 'Core 2,' and 'Core 3.' In the example of FIG. 6, Core 0 copies an array to be reduced by the allreduce operation into the shared memory contribution buffer 'C Buff 0.' Core 1 copies an array to be reduced by the allreduce operation into the shared memory contribution buffer 'C Buff 1.' Core 2 copies an array to be reduced by the allreduce operation into the shared memory contribution buffer 'C Buff 2.' Core 3 copies an array to be reduced by the allreduce operation into the shared memory contribution buffer 'C Buff 3.'

The method of FIG. 6 includes updating (616), by each available core on the compute node (102), the job status object (608) with a descriptor of the shared memory buffer into which the available core copied the array. Each available core on the compute node (102) may update (616) the job status object (608) with a descriptor of the shared memory buffer into which the available core copied the array according to the method of FIG. 6 by inserting the base address of the buffer into the row of the job status object (608) representing the buffer. Each available core on the compute node (102) may also update (616) the job status object (608) with a descriptor of the shared memory buffer into which the available core copied the array according to the method of FIG. 6 by inserting the number of elements of the copied array into the 'Elements to Process' field. The state of the exemplary job status object after being updated by each available processing core may be illustrated in Table 2:

TABLE 2

| | JOB STATUS OBJECT | | | |
|---|---|---|---|---|
| BUFF. ID | CURRENTLY PROCESSING | BASE ADDRESS | BUFFER SIZE | ELEMENTS TO PROCESS |
| C Buff 0 | No | 0xAEEC0000 | 4096 | 4096 |
| C Buff 1 | No | 0xAEECF200 | 4096 | 4096 |
| C Buff 2 | No | 0xAEECE700 | 4096 | 4096 |
| C Buff 3 | No | 0xAEEC0000 | 4096 | 4096 |
| IR Buff 0 | No | 0xAEEEEE00 | 4096 | 0 |
| IR Buff 1 | No | 0xAEEEEF00 | 4096 | 0 |

TABLE 2-continued

JOB STATUS OBJECT

| BUFF. ID | CURRENTLY PROCESSING | BASE ADDRESS | BUFFER SIZE | ELEMENTS TO PROCESS |
|---|---|---|---|---|
| LRR Buff | No | 0xAEEEF000 | 4096 | 0 |
| GRR Buff | No | 0xAEEEF100 | 4096 | 0 |

In the exemplary job status object illustrated in Table 2, each available processing core has updated the job status object with the base address of the shared memory buffer into which the processing core copied its array for reduction. In the exemplary job status object illustrated in Table 2, each available processing core has also updated the job status object with the number of elements, 4096, in the core's copied array that are to be processed in performing the allreduce operation.

The method of FIG. 6 includes determining (618), by an available core on the compute node (102), a next shared memory allreduce work unit (620) in the job status object (608). An available core may determine (618), by an available core on the compute node (102), a next shared memory allreduce work unit (620) in the job status object (608) according to the method of FIG. 6 by identifying work units (610) in the job status object (608) with elements to be processed and that are not currently being processed by another processing core and selecting one of the identified work units based on selection criteria. Selection criteria may dictate that the work unit (610) with the most elements to be processed is selected, that the work unit (610) with the most elements to be processed and having certain buffer identifiers is selected, that the first work unit (610) scanned in the job status object (608) with elements to be processed and that are not currently being processed by another processing core is selected, or any other selection criteria as will occur to those of skill in the art.

The method of FIG. 6 also includes performing (622), by that available core on the compute node (102), that next shared memory allreduce work unit (620). The available core on the compute node (102) may perform (622) that next shared memory allreduce work unit (620) according to the method of FIG. 6 by performing a reduction operation on elements of arrays to be reduced, transmitting local reduction results to one or more other compute nodes through the global combining network, receiving global reduction results through the network, and storing the global reduction results into shared memory as discussed in more detail below with reference to FIG. 7.

Figure 7:
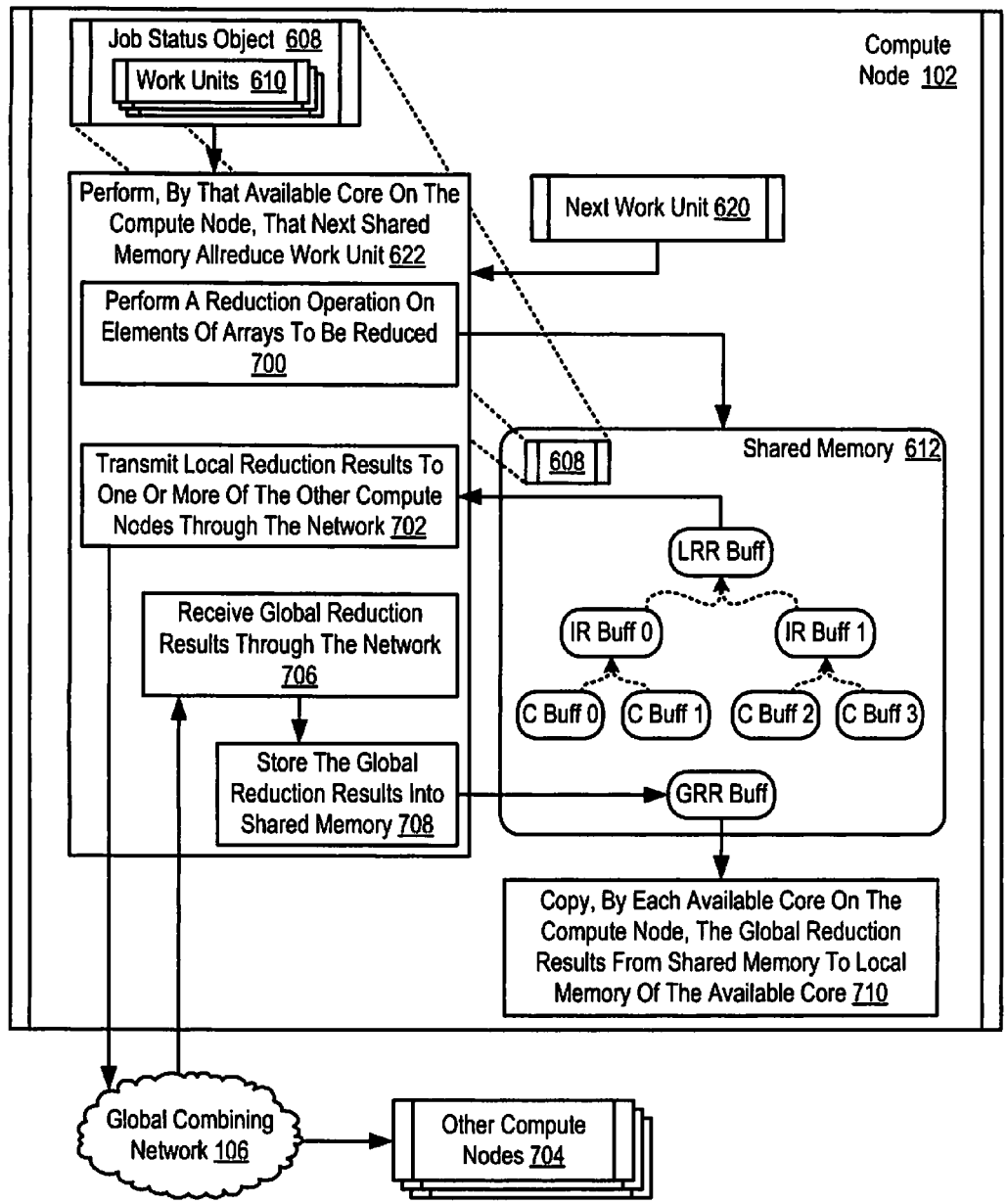
FIG. 7 sets forth a flow chart illustrating an exemplary method of performing that next shared memory allreduce work unit useful in performing an allreduce operation using shared memory according to embodiments of the present invention.

For further explanation, FIG. 7 sets forth a flow chart illustrating an exemplary method of performing (622) that next shared memory allreduce work unit (620) useful in performing an allreduce operation using shared memory (612) according to embodiments of the present invention. In the example of FIG. 7, the compute node (102) is connected to a plurality of other compute nodes (704) through a data communications network (106), specifically a global combing network as discussed above with reference to FIG. 5.

In the method of FIG. 7, the available core on the compute node (102) performs (622) that next shared memory allreduce work unit (620) by performing (700) a reduction operation on elements of arrays to be reduced. The available core may perform (700) the reduction operation on elements of arrays to be reduced according to the method of FIG. 7 by setting a flag in the job status object (608) for two buffers of the same type that store arrays to be reduced to indicate that the processing core is currently processing the elements in each of these buffers. The available core may then apply the arithmetic reduction operator to elements of the two arrays stored in these two buffers, store the result of the reduction into another shared memory buffer, decrement the number of elements to be processed in the buffer containing the two arrays to be reduced by the number of elements actually processed, and increment the number of elements to be processed in the shared memory buffer storing the result of the reduction by the number of elements stored in the shared memory buffer. After updating the elements to be processed for each buffer, the processing core resets the flag in the job status object (608) for two buffers that stored arrays to be reduced to indicate that the processing core is not currently processing the elements in each of these buffers. The arithmetic reduction operator may be specified by the instruction to perform the allreduce operation and may include, for example, a bitwise OR operator, an addition operator, a multiplication operator, and so on.

For further explanation of performing (700) a reduction operation on elements of arrays to be reduced, consider again Table 2 above as described with reference to FIG. 6. Using the state of the job status object illustrated in Table 2, an available processing core may determine that the next shared memory allreduce work unit to be performed is to reduce the elements of the arrays stored in buffers 'C Buff 0' and 'C Buff 1' because the job status object (608) indicates that 'C Buff 0' and 'C Buff 1' having 4096 elements that need to be processed. The processing core may then set the 'Currently Processing' field to indicate that the core is processing elements of the arrays stored in buffers 'C Buff 0' and 'C Buff 1.' The processing core may then apply an arithmetic reduction operator to the elements in buffers 'C Buff 0' and 'C Buff 1' and store the result in interim buffer 'IR Buff 0.' The processing core then decrements the number of elements to be processed in buffers 'C Buff 0' and 'C Buff 1' and increments the number of elements to be processed in the interim buffer 'IR Buff 0' by the number of element the core processed. After updating the number of elements to be processed for each buffer, the processing core may then set the 'Currently Processing' field to indicate that the core is not currently processing elements of the arrays stored in buffers 'C Buff 0' and 'C Buff 1.' This exemplary work unit described above is illustrated by the dotted arrow illustrated in FIG. 7 from each of the buffers 'C Buff 0' and 'C Buff 1' to the interim buffer 'IR Buff 0.' The resulting state of the job status object may be the exemplary state illustrated in Table 3:

TABLE 3

JOB STATUS OBJECT

| BUFF. ID | CURRENTLY PROCESSING | BASE ADDRESS | BUFFER SIZE | ELEMENTS TO PROCESS |
|---|---|---|---|---|
| C Buff 0 | No | 0xAEEC0000 | 4096 | 0 |
| C Buff 1 | No | 0xAEECF200 | 4096 | 0 |
| C Buff 2 | No | 0xAEECE700 | 4096 | 4096 |
| C Buff 3 | No | 0xAEEC0000 | 4096 | 4096 |
| IR Buff 0 | No | 0xAEEEEE00 | 4096 | 4096 |
| IR Buff 1 | No | 0xAEEEEF00 | 4096 | 0 |
| LRR Buff | No | 0xAEEEF000 | 4096 | 0 |
| GRR Buff | No | 0xAEEEF100 | 4096 | 0 |

The state of the exemplary job status object illustrated in Table 3 indicates that the available processing core reduced 4096 elements from buffers 'C Buff 0' and 'C Buff 1' and stored the result in interim buffer 'IR Buff 0.' Readers will note that while the processing core reduced the elements in buffers 'C Buff 0' and 'C Buff 1' and stored the result in interim buffer 'IR Buff 0,' the 'Currently Processing' fields for buffers 'C Buff 0' and 'C Buff 1' were set to 'Yes.' Setting the 'Currently Processing' field to 'Yes' operates as a semaphore to prevent other available processing cores from processing buffers 'C Buff 0' and 'C Buff 1' while the current available processing core processes these buffers.

While one available processing core is reducing elements from buffers 'C Buff 0' and 'C Buff 1' and storing the result in interim buffer 'IR Buff 0,' another available processing core may determine that the next shared memory allreduce work unit to be perform is to reduce the elements of the arrays stored in buffers 'C Buff 2' and 'C Buff 3' because the job status object indicates that 'C Buff 2' and 'C Buff 3' having 4096 elements that need to be processed. The processing core may then set the 'Currently Processing' field to indicate that the core is processing elements of the arrays stored in buffers 'C Buff 2' and 'C Buff 3.' The processing core may then apply an arithmetic reduction operator to the elements in buffers 'C Buff 2' and 'C Buff 3' and store the result in interim buffer 'IR Buff 1.' The processing core then decrements the number of elements to be processed in buffers 'C Buff 2' and 'C Buff 3' and increments the number of elements to be processed in the interim buffer 'IR Buff 1' by the number of element the core processed. After updating the number of elements to be processed for each buffer, the processing core may then set the 'Currently Processing' field to indicate that the core is not currently processing elements of the arrays stored in buffers 'C Buff 2' and 'C Buff 3.' This exemplary work unit is illustrated by the dotted arrow illustrated in FIG. 7 from each of the buffers 'C Buff 2' and 'C Buff 3' to the interim buffer 'IR Buff 1.' The resulting state of the job status object may be the exemplary state illustrated in Table 4:

TABLE 4

| | JOB STATUS OBJECT | | | |
|---|---|---|---|---|
| BUFF. ID | CURRENTLY PROCESSING | BASE ADDRESS | BUFFER SIZE | ELEMENTS TO PROCESS |
| C Buff 0 | No | 0xAEEC0000 | 4096 | 0 |
| C Buff 1 | No | 0xAEECF200 | 4096 | 0 |
| C Buff 2 | No | 0xAEECE700 | 4096 | 0 |
| C Buff 3 | No | 0xAEEC0000 | 4096 | 0 |
| IR Buff 0 | No | 0xAEEEEE00 | 4096 | 4096 |
| IR Buff 1 | No | 0xAEEEEF00 | 4096 | 4096 |
| LRR Buff | No | 0xAEEEF000 | 4096 | 0 |
| GRR Buff | No | 0xAEEEF100 | 4096 | 0 |

The state of the exemplary job status object illustrated in Table 4 indicates that the available processing core reduced 4096 elements from buffers 'C Buff 2' and 'C Buff 3' and stored the result in interim buffer 'IR Buff 1.' Readers will note that while the processing core reduced the elements in buffers 'C Buff 2' and 'C Buff 3' and stored the result in interim buffer 'IR Buff 1,' the 'Currently Processing' fields for buffers 'C Buff 2' and 'C Buff 3' were set to 'Yes' to prevent other available processing cores from processing these buffers.

After results begin to be stored in interim result buffers 'IR Buff 0' and 'IR Buff 1,' another available processing core may determine that the next shared memory allreduce work unit to be perform is to reduce the elements of the arrays stored in interim buffers 'IR Buff 0' and 'IR Buff 1' because the job status object indicates that 'IR Buff 0' and 'IR Buff 1' have some elements that need to be processed. The processing core may then set the 'Currently Processing' field to indicate that the core is processing elements of the arrays stored in buffers 'IR Buff 0' and 'IR Buff 1.' The processing core may then apply an arithmetic reduction operator to the elements in buffers 'IR Buff 0' and 'IR Buff 1' and store the result in the local reduction results buffer 'LRR Buff.' The processing core then decrements the number of elements to be processed in buffers 'IR Buff 0' and 'IR Buff 1' and increments the number of elements to be processed in the buffer 'LRR Buff' by the number of element that the core processed. After updating the number of elements to be processed for each buffer, the processing core may then set the 'Currently Processing' field to indicate that the core is not currently processing elements of the arrays stored in buffers 'IR Buff 0' and 'IR Buff 1.' This exemplary work unit is illustrated by the dotted arrow illustrated in FIG. 7 from each of the interim buffers 'IR Buff 0' and 'IR Buff 1' to the local reduction results buffer 'LRR Buff.' The resulting state of the job status object may be the exemplary state illustrated in Table 5:

TABLE 5

| | JOB STATUS OBJECT | | | |
|---|---|---|---|---|
| BUFF. ID | CURRENTLY PROCESSING | BASE ADDRESS | BUFFER SIZE | ELEMENTS TO PROCESS |
| C Buff 0 | No | 0xAEEC0000 | 4096 | 0 |
| C Buff 1 | No | 0xAEECF200 | 4096 | 0 |
| C Buff 2 | No | 0xAEECE700 | 4096 | 0 |
| C Buff 3 | No | 0xAEEC0000 | 4096 | 0 |
| IR Buff 0 | No | 0xAEEEEE00 | 4096 | 0 |
| IR Buff 1 | No | 0xAEEEEF00 | 4096 | 0 |
| LRR Buff | No | 0xAEEEF000 | 4096 | 4096 |
| GRR Buff | No | 0xAEEEF100 | 4096 | 0 |

The state of the exemplary job status object illustrated in Table 5 indicates that the available processing core reduced 4096 elements from buffers 'IR Buff 0' and 'IR Buff 1' and stored the result in the local reduction results buffer 'LRR Buff.' Readers will note that while the processing core reduced the elements in buffers 'IR Buff 0' and 'IR Buff 1' and stored the result in buffer 'LRR Buff,' the 'Currently Processing' fields for buffers 'IR Buff 0' and 'IR Buff 1' were set to 'Yes' to prevent other available core from processing these buffers.

In the method of FIG. 7, the available core on the compute node (102) also performs (622) that next shared memory allreduce work unit (620) by transmitting (702), by that available core, local reduction results to one or more of the other compute nodes (704) through the network (106). The available processing core may transmit (702) local reduction results to one or more of the other compute nodes (704) through the network (106) according to the method of FIG. 7 by copying elements stored in the local reductions result buffer 'LRR Buff' to injection stacks in the compute node's network adapter for transmission through the network (106) to the other compute nodes (704) and decrementing the number of elements to be processed for the 'LRR Buff' in the job status object (608). The resulting state of the job status object may be the exemplary state illustrated in Table 6:

TABLE 6

| | JOB STATUS OBJECT | | | |
|---|---|---|---|---|
| BUFF. ID | CURRENTLY PROCESSING | BASE ADDRESS | BUFFER SIZE | ELEMENTS TO PROCESS |
| C Buff 0 | No | 0xAEEC0000 | 4096 | 0 |
| C Buff 1 | No | 0xAEECF200 | 4096 | 0 |
| C Buff 2 | No | 0xAEECE700 | 4096 | 0 |
| C Buff 3 | No | 0xAEEC0000 | 4096 | 0 |
| IR Buff 0 | No | 0xAEEEEE00 | 4096 | 0 |

TABLE 6-continued

JOB STATUS OBJECT

| BUFF. ID | CURRENTLY PROCESSING | BASE ADDRESS | BUFFER SIZE | ELEMENTS TO PROCESS |
|---|---|---|---|---|
| IR Buff 1 | No | 0xAEEEEF00 | 4096 | 0 |
| LRR Buff | No | 0xAEEEF000 | 4096 | 0 |
| GRR Buff | No | 0xAEEEF100 | 4096 | 0 |

The state of the exemplary job status object illustrated in Table 6 indicates that the available processing core reduced 4096 elements from buffer 'LRR Buff' by transmitting the elements through the network (106) to the other compute nodes (704). Readers will note that while the processing core reduced the elements in local reduction results buffer 'LRR Buff,' the 'Currently Processing' field for the buffer is set to 'Yes' to prevent other available processing cores from processing the buffer.

Readers will recall from above that the local reduction results injected into the network (106) by all the compute nodes connected to the network (106) are reduced to produce a global reduction result. In the method of FIG. 7, the available core on the compute node (102) also performs (622) that next shared memory allreduce work unit (620) by receiving (706) global reduction results through the network (106) and storing (708) the global reduction results into shared memory (612). The available processing core may receive (706) the global reduction results through the network (106) and store (708) the global reduction results into shared memory (612) according to the method of FIG. 7 by copying elements of the global reduction results as these elements are received from the reception stacks in the network adapter of the compute node to the global reduction results buffer 'GRR Buff' in shared memory (612) and incrementing the number of elements to be processed for the 'GRR Buff.' The resulting state of the job status object may be the exemplary state illustrated in Table 7:

TABLE 7

JOB STATUS OBJECT

| BUFF. ID | CURRENTLY PROCESSING | BASE ADDRESS | BUFFER SIZE | ELEMENTS TO PROCESS |
|---|---|---|---|---|
| C Buff 0 | No | 0xAEEC0000 | 4096 | 0 |
| C Buff 1 | No | 0xAEECF200 | 4096 | 0 |
| C Buff 2 | No | 0xAEECE700 | 4096 | 0 |
| C Buff 3 | No | 0xAEEC0000 | 4096 | 0 |
| IR Buff 0 | No | 0xAEEEEE00 | 4096 | 0 |
| IR Buff 1 | No | 0xAEEEEF00 | 4096 | 0 |
| LRR Buff | No | 0xAEEEF000 | 4096 | 0 |
| GRR Buff | No | 0xAEEEF100 | 4096 | 4096 |

The state of the exemplary job status object illustrated in Table 7 indicates that the available processing core added 4096 elements into buffer 'GRR Buff' by receiving the global reduction results through the network (106) and storing the global reduction results into shared memory (612).

Performing an allreduce operation using shared memory (612) according to the method of FIG. 7 continues by copying (710), by each available core on the compute node (102), the global reduction results from the shared memory (612) to local memory of the available core. Each available core on the compute node (102) may copy (710) the global reduction results from the shared memory (612) to local memory of the available core as the elements are stored in the buffer 'GRR Buff.' As the buffer 'GRR Buff' is populated with new global reduction result elements, each processing core may compare the number of elements to be processed for the 'GRR Buff' buffer with the number of elements the core has already copied to local memory from the buffer 'GRR Buff' to determine whether new elements have arrived since the last time the processing core copied data from the 'GRR Buff' buffer.

As mentioned above, each available processing core on a compute node may copy an array to be reduced by the allreduce operation into memory buffers allocated from shared memory. In other embodiments, however, each available processing core may provide a read-only window into a local memory buffer containing an array to be reduced by the allreduce operation. For further explanation, FIG. 8 sets forth a flow chart illustrating an exemplary method of performing an allreduce operation using shared memory (612) according to embodiments of the present invention that includes providing (800), by each available core to each other available core, a read-only window into a buffer containing an array to be reduced by the allreduce operation.

Figure 8:
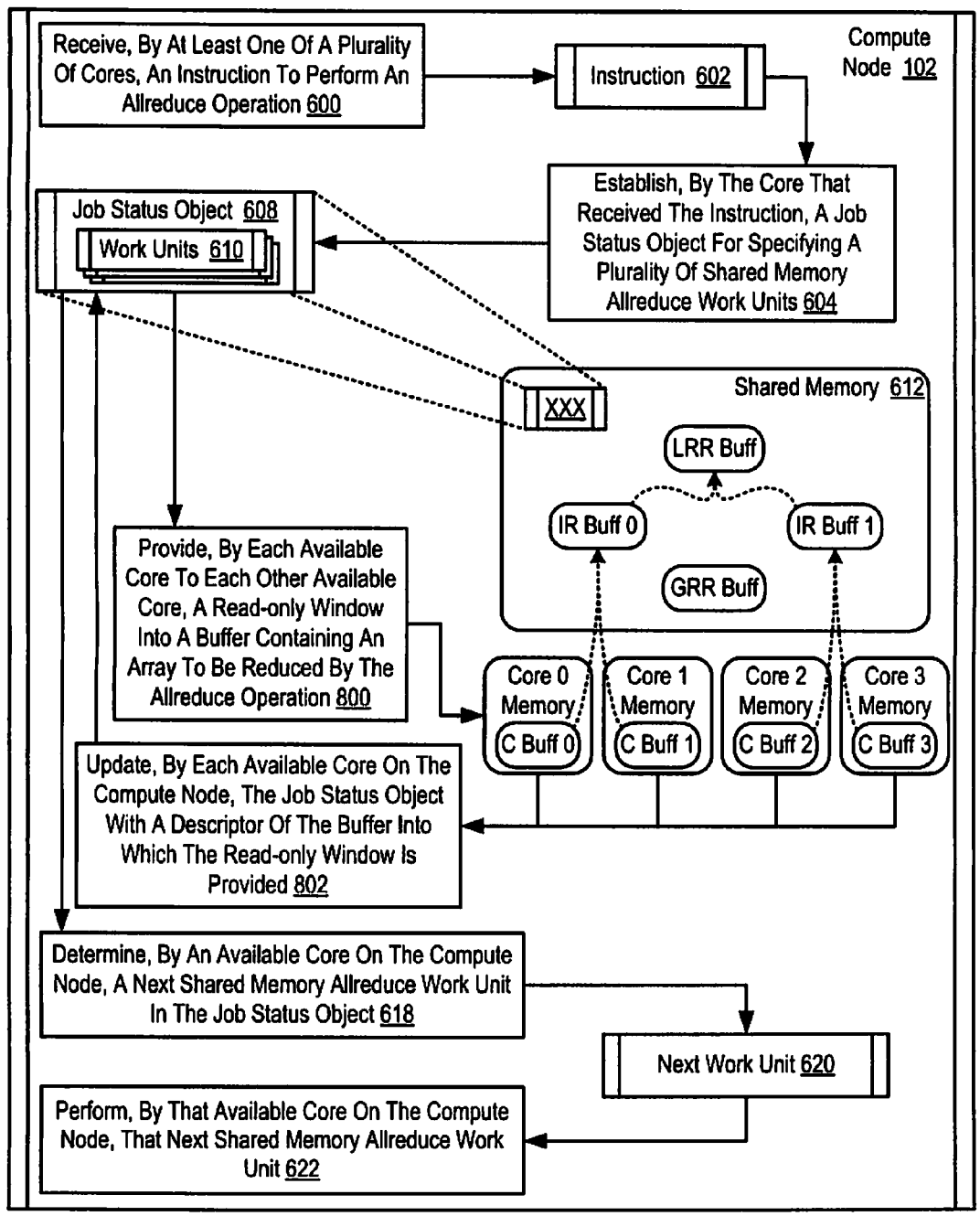
FIG. 8 sets forth a flow chart illustrating an exemplary method of performing an allreduce operation using shared memory according to embodiments of the present invention.

The method of FIG. 8 is similar to the method of FIG. 6. That is, the method of FIG. 8 includes: receiving (600), by at least one of a plurality of processing cores on a compute node (102), an instruction (602) to perform an allreduce operation; establishing (604), by the core that received the instruction, a job status object (608) for specifying a plurality of shared memory allreduce work units (610), the plurality of shared memory allreduce work units (610) together performing the allreduce operation on the compute node; determining (618), by an available core on the compute node (102), a next shared memory allreduce work unit (620) in the job status object (608); and performing (622), by that available core on the compute node (102), that next shared memory allreduce work unit (620).

The method of FIG. 8 differs from the method of FIG. 6, however, in that the method of FIG. 8 includes providing (800), by each available core to each other available core, a read-only window into a local memory buffer containing an array to be reduced by the allreduce operation. Each available core may provide (800) a read-only window into a local memory buffer containing an array to be reduced by the allreduce operation to each of the other available cores according to the method of FIG. 8 by configuring a translation look-a-side buffer ('TLB') for the available processing core to map a portion of that core's virtual memory address space to physical address space allocated to each of the other available cores. A TLB is a cache in a processing core that is used to improve the speed of translating virtual memory addresses into physical memory addresses. In the example of FIG. 8, Core 0 provides a read-only window into a local memory buffer 'C Buff 0' stored in Core 0's local memory. Core 1 provides a read-only window into a local memory buffer 'C Buff 1' stored in Core 1's local memory. Core 2 provides a read-only window into a local memory buffer 'C Buff 2' stored in Core 2's local memory. Core 3 provides a read-only window into a local memory buffer 'C Buff 3' stored in Core 3's local memory. Providing (800), by each available core to each other available core, a read-only window into a local memory buffer containing an array to be reduced by the allreduce operation advantageously allows each core available to process work units (610) to access the buffers containing arrays to be reduced by the allreduce operation without having all the available processing cores first copy the buffers into shared memory (612).

The method of FIG. 8 also includes updating (802), by each available core on the compute node (102), the job status object (608) with a descriptor of the buffer into which the read-only window is provided. Each available core on the compute node (102) may update (802) the job status object (608) with a descriptor of the buffer into which the read-only window is provided according to the method of FIG. 8 by inserting the base address of the local memory buffer into the row of the job status object (608) representing the local memory buffer. Each available core on the compute node (102) may update (802) the job status object (608) with a descriptor of the buffer into which the read-only window is provided according to the method of FIG. 8 by inserting the number of elements in the local memory buffer into the 'Elements to Process' field in the row representing the local memory buffer in the job status object (608). The remaining steps of FIG. 8 may operate as described above with reference to FIG. 6.

Exemplary embodiments of the present invention are described largely in the context of a fully functional computer system for performing an allreduce operation using shared memory. Readers of skill in the art will recognize, however, that the present invention also may be embodied in a computer program product disposed on computer-readable media for use with any suitable data processing system. Such computer-readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for performing an allreduce operation using shared memory, the method comprising:
   receiving, by at least one of a plurality of processing cores on a compute node, an instruction to perform an allreduce operation;
   establishing, by the core that received the instruction, a job status object for specifying a plurality of shared memory allreduce work units, the plurality of shared memory allreduce work units together performing the allreduce operation on the compute node;
   determining, by an available core on the compute node, a next shared memory allreduce work unit in the job status object; and
   performing, by that available core on the compute node, that next shared memory allreduce work unit;
   providing, by each available core to each other available core, a read-only window into a local memory buffer containing an array to be reduced by the allreduce operation; and
   updating, by each available core on the compute node, the job status object with a descriptor of the buffer into which the read-only window is provided.

2. The method of claim 1 wherein establishing, by the core that received the instruction, a job status object for specifying a plurality of shared memory allreduce work units further comprises assigning a plurality of threads for executing the shared memory allreduce work units.

3. The method of claim 1 further comprising:
   copying, by each available core on the compute node into separate shared memory buffers, an array to be reduced by the allreduce operation; and
   updating, by each available core on the compute node, the job status object with a descriptor of the shared memory buffer into which the available core copied the array.

4. The method of claim 1 wherein performing, by that available core on the compute node, that next shared memory allreduce work unit further comprises performing a reduction operation on elements of arrays to be reduced.

5. The method of claim 1 wherein:
   the compute node is connected to a plurality of other compute nodes through a data communications network; and
   performing, by that available core on the compute node, that next shared memory allreduce work unit further comprises transmitting, by that available core, local reduction results to one or more of the other compute nodes through the network.

6. The method of claim 1 wherein:
   the compute node is connected to a plurality of other compute nodes through a data communications network;
   performing, by that available core on the compute node, that next shared memory allreduce work unit further comprises:
   receiving global reduction results through the network, and storing the global reduction results into shared memory; and
   the method further comprises copying, by each available core on the compute node, the global reduction results from the shared memory to local memory of the available core.

7. A compute node for performing an allreduce operation using shared memory, the compute node comprising a plurality of processing cores, computer memory operatively coupled to the plurality of processing cores, the computer memory having disposed within it computer program instructions for:
   receiving, by at least one of the plurality of processing cores on the compute node, an instruction to perform an allreduce operation;
   establishing, by the core that received the instruction, a job status object for specifying a plurality of shared memory allreduce work units, the plurality of shared memory allreduce work units together performing the allreduce operation on the compute node;
   determining, by an available core on the compute node, a next shared memory allreduce work unit in the job status object; and
   performing, by that available core on the compute node, that next shared memory allreduce work unit;
   providing, by each available core to each other available core, a read-only window into a local memory buffer containing an array to be reduced by the allreduce operation; and updating, by each available core on the compute node, the job status object with a descriptor of the buffer into which the read-only window is provided.

8. The compute node of claim 7 wherein the computer memory also has disposed within it computer program instructions capable of:
   copying, by each available core on the compute node into separate shared memory buffers, an array to be reduced by the allreduce operation; and
   updating, by each available core on the compute node, the job status object with a descriptor of the shared memory buffer into which the available core copied the array.

9. The compute node of claim 7 wherein performing, by that available core on the compute node, that next shared memory allreduce work unit further comprises performing a reduction operation on elements of arrays to be reduced.

10. The compute node of claim 7 wherein:
   the compute node is connected to a plurality of other compute nodes through a data communications network; and
   performing, by that available core on the compute node, that next shared memory allreduce work unit further comprises transmitting, by that available core, local reduction results to one or more of the other compute nodes through the network.

11. The compute node of claim 7 wherein:
   the compute node is connected to a plurality of other compute nodes through a data communications network;
   performing, by that available core on the compute node, that next shared memory allreduce work unit further comprises:
   receiving global reduction results through the network, and storing the global reduction results into shared memory; and
   the computer memory also has disposed within it computer program instructions capable of copying, by each available core on the compute node, the global reduction results from the shared memory to local memory of the available core.

12. A computer program product for performing an allreduce operation using shared memory, the computer program product disposed upon a computer-readable, recordable storage medium, the computer program product comprising computer program instructions for:
   receiving, by at least one of a plurality of processing cores on a compute node, an instruction to perform an allreduce operation;
   establishing, by the core that received the instruction, a job status object for specifying a plurality of shared memory allreduce work units, the plurality of shared memory allreduce work units together performing the allreduce operation on the compute node;
   determining, by an available core on the compute node, a next shared memory allreduce work unit in the job status object; and
   performing, by that available core on the compute node, that next shared memory allreduce work unit;
   providing, by each available core to each other available core, a read-only window into a local memory buffer containing an array to be reduced by the allreduce operation; and
   updating, by each available core on the compute node, the job status object with a descriptor of the buffer into which the read-only window is provided.

13. The computer program product of claim 12 wherein establishing, by the core that received the instruction, a job status object for specifying a plurality of shared memory allreduce work units further comprises assigning a plurality of threads for executing the shared memory allreduce work units.

14. The computer program product of claim 12 further comprising computer program instructions capable of:
   copying, by each available core on the compute node into separate shared memory buffers, an array to be reduced by the allreduce operation; and
   updating, by each available core on the compute node, the job status object with a descriptor of the shared memory buffer into which the available core copied the array.

15. The computer program product of claim 12 wherein performing, by that available core on the compute node, that next shared memory allreduce work unit further comprises performing a reduction operation on elements of arrays to be reduced.

16. The computer program product of claim 12 wherein:
   the compute node is connected to a plurality of other compute nodes through a data communications network; and
   performing, by that available core on the compute node, that next shared memory allreduce work unit further comprises transmitting, by that available core, local reduction results to one or more of the other compute nodes through the network.

17. The computer program product of claim 12 wherein:
   the compute node is connected to a plurality of other compute nodes through a data communications network;
   performing, by that available core on the compute node, that next shared memory allreduce work unit further comprises:
   receiving global reduction results through the network, and storing the global reduction results into shared memory; and
   the computer program product further comprises computer program instructions capable of copying, by each available core on the compute node, the global reduction results from the shared memory to local memory of the available core.

* * * * *